United States Patent
Liu et al.

(10) Patent No.: US 8,433,428 B2
(45) Date of Patent: Apr. 30, 2013

(54) SYSTEMS AND METHODS FOR MANAGING MACHINE TOOLS

(75) Inventors: ShinYen Liu, Taiping (TW); ChunTai Yen, Taipei (TW); HsiaoWei Chen, Bade (TW)

(73) Assignee: Institute for Information Industry, Taipei (TW)

( * ) Notice: Subject to any disclaimer, the term of this patent is extended or adjusted under 35 U.S.C. 154(b) by 331 days.

(21) Appl. No.: 12/827,509

(22) Filed: Jun. 30, 2010

(65) Prior Publication Data

US 2011/0144795 A1 Jun. 16, 2011

(30) Foreign Application Priority Data

Dec. 10, 2009 (TW) .............................. 98142212 A (51) Int. Cl.
G05B 11/01 (2006.01)
G06F 19/00 (2006.01)
G06F 7/00 (2006.01)
G06F 11/30 (2006.01)

(52) U.S. Cl.
USPC ............ 700/49; 700/47; 700/110; 700/177; 700/180; 707/776; 702/183; 702/185; 702/188

(58) Field of Classification Search ............ 700/47, 700/48, 49, 110, 121, 177, 180; 707/776; 702/183–185, 188
See application file for complete search history.

(56) References Cited

U.S. PATENT DOCUMENTS

| | | | |
|---|---|---|---|
| 4,985,857 A * | 1/1991 | Bajpai et al. | 702/184 |
| 2003/0115510 A1* | 6/2003 | Takayama | 714/47 |
| 2005/0004780 A1* | 1/2005 | Lin et al. | 702/184 |
| 2006/0288260 A1* | 12/2006 | Xiao et al. | 714/48 |

* cited by examiner

*Primary Examiner* — Sean Shechtman
(74) *Attorney, Agent, or Firm* — Birch, Stewart, Kolasch & Birch, LLP (57) ABSTRACT

Systems and methods for managing machine tools are provided. When a current abnormality occurs in one of at least one machine tool, a specific failure category is determined according to the current abnormality, and at least one suggested combination of parameters is generated according to the specific failure category and a transaction database, wherein the specific failure category is one of a plurality of predefined failure categories, and each suggested combination of parameters includes a plurality of associated parameters, which are commonly retrieved for the specific failure category. Each transaction data in the transaction database records a plurality of parameters corresponding to a failure category, wherein the parameters are the parameters whose parameter values are retrieved from the at least one machine tool, having the abnormality according to the failure category.

19 Claims, 4 Drawing Sheets

SYSTEMS AND METHODS FOR MANAGING MACHINE TOOLS

CROSS REFERENCE TO RELATED APPLICATIONS

This Application claims priority of Taiwan Patent Application No. 098142212, filed on Dec. 10, 2009, the entirety of which is incorporated by reference herein.

BACKGROUND OF THE INVENTION

1. Field of the Invention

The disclosure relates generally to management systems and methods for machine tools, and more particularly, to remote management systems and methods for machine tools that automatically provide suggested combination of parameters to manage a machine tool via a network when a current abnormality occurs in the machine tool.

2. Description of the Related Art

Machine tools are necessary pieces of equipment in basic and precision manufacturing. Machine tools are closely correlated with the general engineering industry, automobile industry, electronic industry, aerospace industry, and/or defense industry.

Generally, an engineer must monitor the operation of a machine tool, thus to real-time perform related management tasks for the machine tool. For example, when an abnormality occurs in the machine tool, the engineer can perform real-time failure obviation/elimination of machine tools. During the repair/troubleshooting operations, the engineer needs to examine the relevant parameters of the machine tool to fine the failure and to ascertain if any components which correspond to the abnormality of the machine tool have been affected. Especially in the remote management system for machine tools, when an exception occurs the parameter retrieved from the machine tool via a communication network becomes important information for failure recognition since the engineer cannot directly check and test the machine tool.

Conventionally, the engineer must determine the parameters to be viewed based on his own experiences, or use a trial and error method to retrieve possible parameter values to examine each component one by one. However, the tool types and related components of machine tools are numerous. The possible failures are also numerous and complicated, and the related components which need to be examined may be different for different failures. Since the number of related parameters is numerous, the engineer must repeatedly try to find the correct parameters, resulting in time-consuming procedures. Therefore, it is important to efficiently determine which related parameters needed to be examined in order to fix the failures which correspond to the respective failures in the machine tool.

In some cases, related experts can define solutions for different failures in advance. However, as described, since the failures which can occur in the machine tool may be numerous and complicated, the predefined solutions cannot efficiently solve the failures which occur in reality, and therefore, the achieved effectiveness of the repair/troubleshooting operations for the machine tool are limited. The engineer still must repeatedly try to retrieve parameters in order to find the cause of abnormal function and to provide repair recommendations.

BRIEF SUMMARY OF THE INVENTION

Management systems and methods for machine tools are provided.

An embodiment of a management system for machine tools comprises at least one machine tool and a remote monitoring host, wherein at least one machine tool connects to the remote monitoring host via a network. The remote monitoring host comprises a storage unit and a processing unit. The storage unit records a transaction database which comprises a plurality of transaction data, wherein each transaction data records a plurality of parameters corresponding to a failure category, the failure category is one of a plurality of predefined failure categories when an abnormality occurs in the at least one machine tool, in which the failure category is corresponded to the abnormality, and the parameters are the parameters whose parameter values are retrieved from the at least one machine tool, having the abnormality, by a remote monitoring host according to the failure category. When a current abnormality occurs in one of at least one machine tool, the processing unit determines a specific failure category according to the current abnormality, and generates at least one suggested combination of parameters according to the specific failure category and the transaction database, wherein the specific failure category is one of the predefined failure categories, and each suggested combination of parameters comprises a plurality of associated parameters, which are commonly retrieved for the specific failure category.

In an embodiment of a management method for machine tools to manage at least one machine tool via a network, a storage unit comprising a transaction database having a plurality of transaction data is provided, wherein each transaction data records a plurality of parameters corresponding to a failure category, and the failure category is one of a plurality of predefined failure categories when an abnormality occurs in the at least one machine tool, in which the failure category is corresponded to the abnormality, and the parameters are the parameters whose parameter values are retrieved from the at least one machine tool, having the abnormality, by a remote monitoring host according to the failure category. When a current abnormality occurs in one of at least one machine tool, a specific failure category is determined according to the current abnormality, and at least one suggested combination of parameters is generated according to the specific failure category and the transaction database, wherein the specific failure category is one of the predefined failure categories, and each suggested combination of parameters comprises a plurality of associated parameters, which are commonly retrieved for the specific failure category.

In some embodiments, the suggested combination of parameters corresponding to the specific failure category is mined from the transaction data of the transaction database using a data mining technology. In some embodiments, the data mining technology is developed by association rules, and the parameters corresponding to a failure category recorded in each transaction data are set as associated items in the association rule.

In some embodiments, the processing unit further transmits a command to the machine tool having the current abnormality via the network according to one of the at least one suggested combination of parameters, wherein the command requests to retrieve the parameter values corresponding to the associated parameters from the machine tool. The machine tool having the current abnormality retrieves parameter values corresponding to the respective associated parameters according to the command, and transmits the parameter values to the remote monitoring host via the network.

In some embodiments, the processing unit further provides an operational interface. The operational interface can be provided to determine the specific failure category by a user. After a calculation of the processing unit, the operational interface can display several suggested combinations of parameters for the specific failure category. The user can select anyone of the suggested combinations of parameters via the operational interface, and the processing unit can transmit a command to the machine tool having the current abnormality via the network according to the selected suggested combination of parameters, wherein the command requests to retrieve the parameter values corresponding to the associated parameters corresponding to the selected suggested combination of parameters from the machine tool. The parameter values corresponding to the associated parameters can be displayed in the operational interface, and the user can reference the parameter values for further diagnosis. The operational interface can be further provided to input a diagnosis result via the operational interface for a user, and when the diagnosis is complete, the processing unit further packages the specific failure category and the retrieved parameters as transaction data, and stores the transaction data in the transaction database.

Management methods for machine tools may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Management systems and methods for machine tools are provided.

Figure 1:
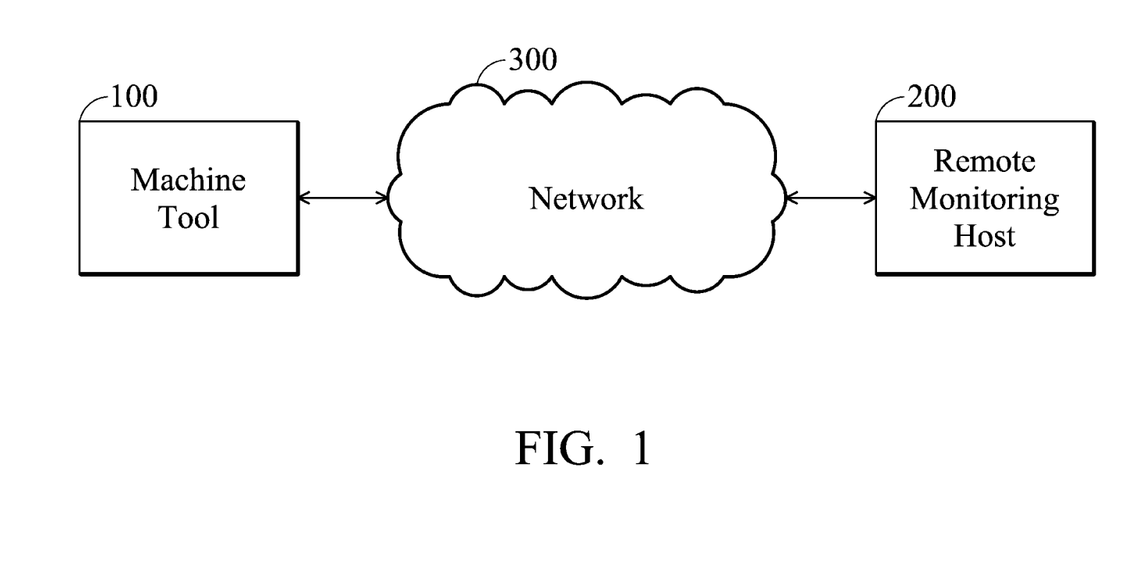
FIG. 1 is a schematic diagram illustrating an embodiment of a management system for machine tools of the invention.

FIG. 1 is a schematic diagram illustrating an embodiment of a management system for machine tools of the invention.

The management system for machine tools comprises at least one machine tool 100 and a remote monitoring host 200. The machine tool 100 may be equipment for basic and/or precision manufacturing. The machine tool 100 may connect to the remote monitoring host 200 via a network 300.

Figure 2:
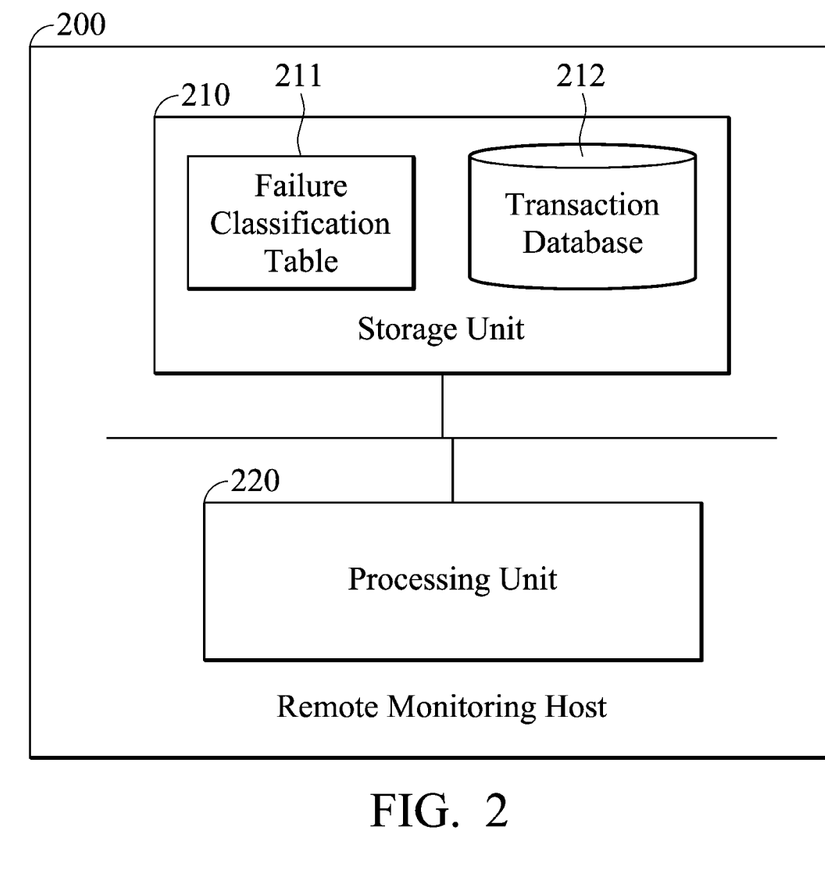
FIG. 2 is a schematic diagram illustrating an embodiment of the architecture of a remote monitoring host of the invention.

FIG. 2 is a schematic diagram illustrating an embodiment of the architecture of a remote monitoring host of the invention. The remote monitoring host 200 may be a processor-based electronic device. The remote monitoring host 200 comprises at least a storage unit 210 and a processing unit 220. The storage unit 210 mainly comprises a transaction database 212 which comprises a plurality of transaction data, wherein each transaction data records a plurality of parameters corresponding to a failure category. For example, when an abnormality occurs in the machine tool, a corresponding failure category can be differentiated from various predefined failure categories, such as a spindle, a servo, a servo axis stroke, a peripheral motor, a knife turret, an emergency door, and/or optional accessories. The above failure category may be one of the predefined failure categories. The transaction database 212 may comprise a plurality of historical transaction data recorded during abnormalities which previously occurred in the machine tool 100. The historical transaction data can record parameters, whose parameter values are commonly retrieved from the machine tool 100 via the remote monitoring host 200 by the engineer in order to solve the failure when the previous abnormalities occurred in the machine tool 100. It is understood that, the parameter value may be a numeric value, a text or other data. The commonly retrieved parameters of the present application may be multiple parameters simultaneously retrieved in a retrieval command, or respectively retrieved during the procedure for handling the abnormalities or solving the failure. The transaction data can be created by engineers or other users based on experiences. For example, an operational interface can be provided by the processing unit 220 to record the plurality of parameters corresponding to the specific failure category for an engineer or a user, and when the current abnormality is occurred in the machine tool having the current abnormality, the recorded plurality of parameters are stored to the transaction database 212 by the processing unit 220. Additionally, the transaction data can be automatically and constantly accumulated via the system of the present invention, which will be discussed further in the following paragraphs.

When a current abnormality occurs in at least one machine tool, the processing unit 220 can determine a specific failure category according to the current abnormality, and generate one or several suggested combinations of parameters according to the transaction database 212. The specific failure category is one of the predefined failure categories, and each suggested combination of parameters comprises a plurality of associated parameters, which are commonly retrieved for the specific failure category. It is understood that, the above current abnormality may be any abnormality which may occur in any one of at least one machine tool 100, and the above current abnormality may be any abnormality which needs a provision of at least one suggested combination of parameters by the processing unit 220.

In some embodiments, the storage unit 210 can further comprise a failure classification table 211. The failure classification table 211 can record a plurality of failure categories and at least one error code corresponding to the respective failure categories, wherein each error code can correspond to one of the failure categories recorded in the failure classification table 211. When an abnormality occurs in the machine tool, an error code corresponding to the abnormality can be generated, and transmitted to the remote monitoring host 200 via the network 300. The processing unit 220 of the remote monitoring host 200 can search the failure classification table 211 according to the error code, and determine a corresponding failure category.

In other embodiments, the processing unit 220 can further transmit a command requesting a retrieval of a plurality of associated parameters to the machine tool 100 via the network 300 according to a generated suggested combination of parameters. The machine tool 100 retrieves/reads parameter values corresponding to the associated parameters from the machine tool 100 according to the command, and transmits the parameter values to the remote monitoring host 200 via the network 300. When only one suggested combination of parameters is available, the processing unit 220 can directly adopt the suggested combination of parameters. When several suggested combinations of parameters are available, the processing unit 220 can filter or sort the suggested combinations of parameters according to various conditions, and use the filtered suggested combination of parameters or the suggested combination of parameters having the highest ranking within the suggested combinations of parameters to generate a retrieval command. In some embodiments, the processing unit may further provide an operational interface to determine a specific failure category for a user. For example, the operational interface maybe have a plurality of options, and each option corresponds to one of the predefined failure categories, such as the failure categories of spindle, servo axis, and others. Then, the processing unit 220 determines the corresponding specific failure category according to the selected option. The options may be the abnormal situations relating to the machine tool, such as when the temperature of the motor is too high, or when the rotation speed of the servo axis is too low. The processing unit 220 can determine a corresponding specific failure category according to the abnormality situation selected by the user via an expert knowledge system, or an additional status matching table recording the abnormality situations of the machine tool and corresponding failure categories. When at least one suggested combination of parameters on the operational interface is selected by the user, the processing unit 220 can transmit a command for retrieving parameters to the machine tool 100 via the network 300. Further, the operational interface (or another operational interface) can display the generated suggested combination of parameters, and provide the user to select at least one suggested combination of parameters. The processing unit 220 transmits a command for retrieving parameters to the machine tool 100 via the network 300 according to the selected suggested combination of parameters.

Figure 3:
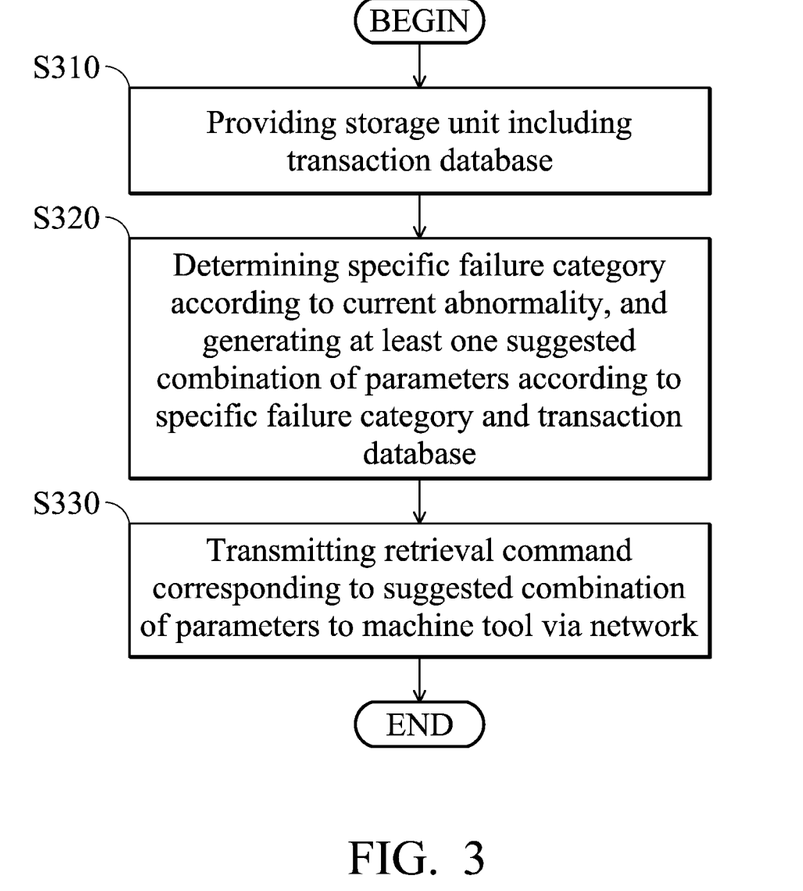
FIG. 3 is a flowchart of an embodiment of a management method for machine tools of the invention.

FIG. 3 is a flowchart of an embodiment of a management method for machine tools of the invention. The management method for machine tools can be used for a remote monitoring host to manage at least one machine tool via a network.

In step S310, a storage unit comprising a transaction database is provided. The transaction database comprises a plurality of transaction data, and each transaction data records a plurality of parameters corresponding to a failure category. The failure category is one of a plurality of predefined failure categories. When an abnormality occurs in at least one machine tool, the failure category is one of the predefined failure categories, which corresponds to the abnormality, and the parameters are the parameters whose parameter values is retrieved from the at least one machine tool, having the abnormality, by a remote monitoring host according to the failure category corresponding to the abnormality In step S320, when a current abnormality occurs in one of at least one machine tool, a specific failure category is determined according to the current abnormality, and at least one suggested combination of parameters is generated according to the specific failure category and the transaction database. The specific failure category is one of the predefined failure categories, and each suggested combination of parameters comprises a plurality of associated parameters, which are commonly retrieved for the specific failure category.

It is understood that, in some embodiments, when an abnormality occurs in the machine tool, the machine tool can generate and transmit an error code corresponding to the abnormality to the remote monitoring host via the network, and in step S320, a specific failure category can be determined according to the error code. It is understood that, in some embodiments, the remote monitoring host can comprise a failure classification table, and the failure classification table records a plurality of failure categories and at least one error code corresponding to the respective failure categories. The specific failure category can be obtained by searching the failure classification table according to the error code transmitted by the machine tool.

In other embodiments, a step S330 can be further performed, wherein a retrieval command generated according to the suggested combination of parameters can be transmitted to the machine tool via the network. Similarly, the transaction database may comprise a plurality of historical transaction data which were recorded when abnormalities occurred in the machine tool, and each transaction data can record a failure category and related parameters which were be viewed for the failure category.

It is understood that, in some embodiments, the suggested combination of parameters corresponding to the specific failure category can be mined from the transaction data of the transaction database using a data mining technology, such that a plurality of associated parameters which are commonly retrieved for the specific failure category are obtained. It is noted that, the data mining technology may be developed by association rules, attribute oriented induction, classification, data clustering, pattern-based similarity search, or data cube. In this invention, the data mining technique is developed by association rules, and the parameters corresponding to the failure category recorded in each transaction data can be set as associated items in the association rule. For example, each transaction data may comprise a failure category and several associated parameters associated with the failure category. These associated parameters may be the parameters which are retrieved and/or reviewed during the same failure previously occurred. Additionally, in some embodiments, data mining can be performed according to a grouping compress tree (GC tree) technique. It is noted that, any data mining technology can be applied in the present invention, and is not limited thereto.

Figure 4:
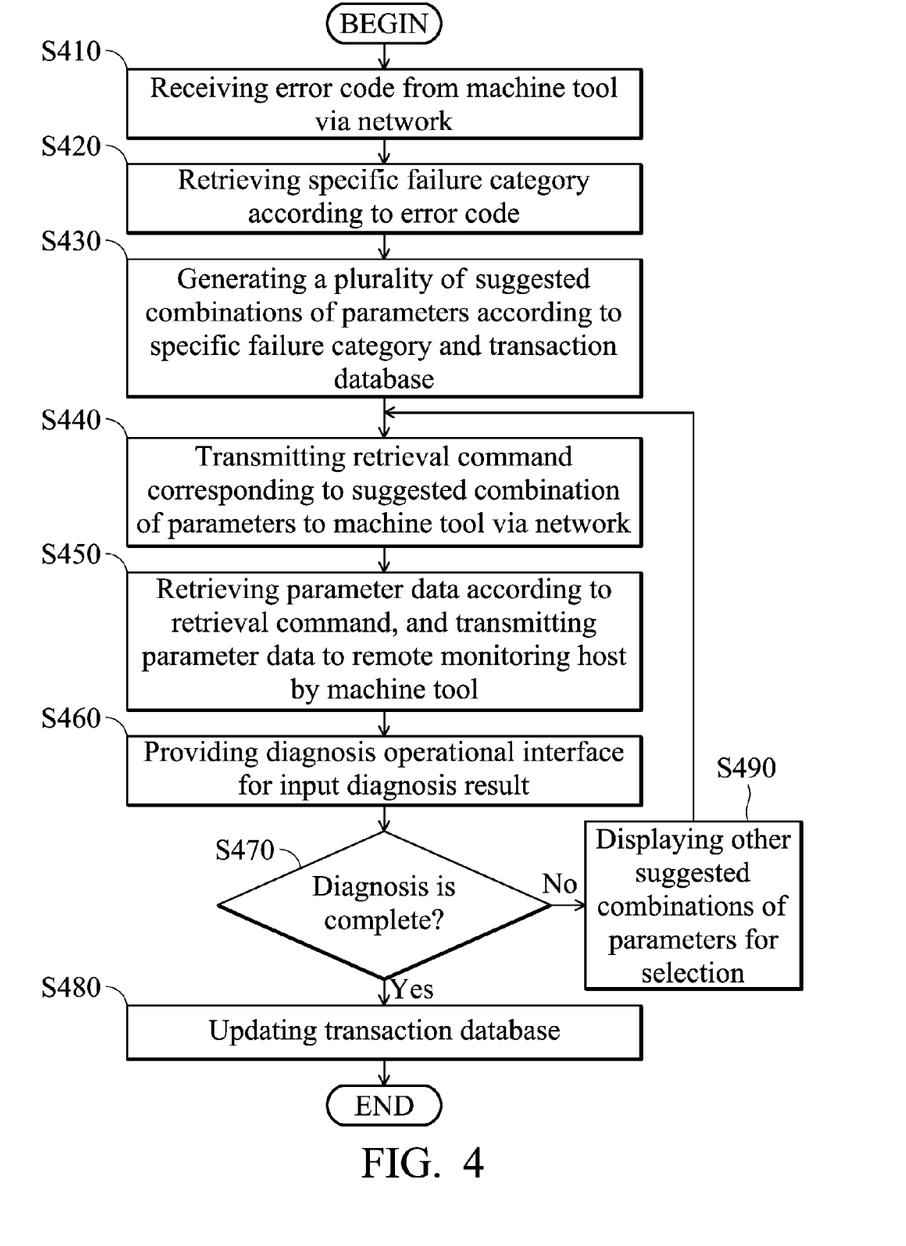
FIG. 4 is a flowchart of another embodiment of a management method for machine tools of the invention.

FIG. 4 is a flowchart of another embodiment of a management method for machine tools of the invention. The management method for machine tools can be used for a remote monitoring host to manage at least one machine tool via a network. In this embodiment, the machine tool can retrieve parameter values according to a suggested combination of parameters, and the retrieved parameter values can be transmitted to the remote monitoring host for related management and/or diagnosis.

In step S410, an error code is received from the machine tool via a network. Similarly, in some embodiments, when an abnormality occurs in the machine tool, the machine tool can generate and transmit an error code corresponding to the abnormality to the remote monitoring host via the network. In step S420, a specific failure category is determined according to the error code. For example, a failure classification table can be provided to record a plurality of failure categories and at least one error code corresponding to the respective failure categories. The specific failure category can be obtained by searching the failure classification table according to the error code transmitted by the machine tool. In step S430, a plurality of suggested combinations of parameters are generated according to the specific failure category and the transaction database, and in step S440, a retrieval command corresponding to one of the suggested combinations of parameters is transmitted to the machine tool. As described, the suggested combinations of parameters corresponding to the specific failure category can be mined from the transaction data of the transaction database using a data mining technology. It is noted that again, any data mining technology can be applied in the present invention, and is not limited thereto.

After the machine tool receives the retrieval command corresponding to the suggested combination of parameters, in step S450, the machine tool respectively retrieves and transmits parameter values corresponding to the associated parameters of the suggested combination of parameters to the remote monitoring host via the network. In step S460, a diagnosis operational interface is provided for the user to input the diagnosis result. It is noted that, the diagnosis operational interface may be an additional interface, or be integrated with the operational interface described above. It is understood that, in some embodiments, a client (not shown in FIG. 1, such as a computer, PC, Notebook, PDA) can be coupled to the remote monitoring host. The diagnosis operational interface can be displayed at the client for a user (such as an engineer) to perform a diagnosis for the machine tool, and be provided for the user to input or select the diagnosis result. In some embodiments, the diagnosis result can indicate if the diagnosis is complete or not, and indicate that another suggested combination of parameters is suggested to select for re-retrieving corresponding parameter values. When the diagnosis result indicates that the diagnosis is complete (Yes in step S470), in step S480, the specific failure category and the corresponding parameters to be retrieved are packaged as transaction data, and the transaction database is updated by storing the transaction data to the transaction database, such that the transaction data in the transaction database can be constantly accumulate and increased. When the diagnosis result indicates that another suggested combination of parameters is suggested for selection (No in step S470), in step S490, other suggested combinations of parameters are displayed for selection, and the procedure returns to step S440, next, a retrieval command corresponding to the new selected suggested combination of parameters is transmitted to the machine tool via the network.

Similarly, the machine tool can retrieve and transmit corresponding parameter values to the remote monitoring host for assisting the user in performing related diagnoses according to one or multiple retrieval commands corresponding to the one or multiple suggested combinations of parameters. When the diagnosis result indicates that the diagnosis is complete, the specific failure category and all parameters involved in the one or multiple retrieval commands are packaged as transaction data, and stored in the transaction database. It is noted that, the new transaction data can be used for subsequent management/diagnosis when an abnormality occurs in the machine tool.

Therefore, the management systems and methods for machine tools can automatically provide suggested combinations of parameters to manage a machine tool via a network. Additionally, the generation of the suggested combinations of parameters can be dynamically adjusted according to the transaction data recorded during previous abnormalities which occurred in the machine tool, thus improving the achievement results of the repair/troubleshooting operations for the machine tool.

Management methods for machine tools, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. When implemented on a general-purpose processor, the program code combines with the processor to provide a unique apparatus that operates analogously to the application of specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A management system for machine tools, comprising:
at least one machine tool; and
a remote monitoring host connected to at least one machine tool via a network, and the remote monitoring host comprises:
    a storage unit recording a transaction database which comprises a plurality of transaction data, wherein each transaction data records a plurality of parameters corresponding to a failure category, and the failure category is one of a plurality of predefined failure categories when an abnormality occurs in the at least one machine tool, in which the failure category is corresponded to the abnormality, and the parameters are the parameters whose parameter values are retrieved from the at least one machine tool, having the abnormality, by the remote monitoring host according to the failure category; and
    a processing unit determining a specific failure category according to a current abnormality occurring in one of at least one machine tool, and generating at least one suggested combination of parameters according to the specific failure category and the transaction database, wherein the specific failure category is one of the predefined failure categories, and each suggested combination of parameters comprises a plurality of associated parameters, which are commonly retrieved for the specific failure category, the at least one suggested combination of parameters corresponding to the specific failure category is mined from the transaction data of the transaction database using a data mining technology developed by association rules, and the parameters corresponding to the failure category recorded in each transaction data are set as associated items in the association rule.

2. The system of claim 1, wherein the processing unit further transmits a command to the machine tool having the current abnormality via the network according to one of the at least one suggested combination of parameters, wherein the command requests to retrieve the parameter values corresponding to the associated parameters from the machine tool.

3. The system of claim 2, wherein the machine tool having the current abnormality retrieves parameter values corresponding to the respective associated parameters according to the command, and transmits the parameter values to the remote monitoring host via the network.

4. The system of claim 2, further comprising an operational interface, wherein the operational interface is provided to record the plurality of parameters corresponding to the specific failure category by a user when the current abnormality is occurred in the machine tool having the current abnormality, and wherein the recorded plurality of parameters are stored to the transaction database by the processing unit.

5. The system of claim 1, wherein the at least one machine tool further generates an error code corresponding to the current abnormality when the current abnormality occurs, and transmits the error code to the remote monitoring host via a network, and the processing unit determines the specific failure category according to the error code.

6. The system of claim 5, wherein the storage unit further comprises a failure classification table for recording the predefined failure categories and at least one error code corresponding to the respective failure categories, and the processing unit searches the failure classification table according to the error code transmitted from the machine tool to determine the specific failure category.

7. The system of claim 1, wherein the processing unit further provides an operational interface, wherein the operational interface is provided to determine the specific failure category for a user and to input a diagnosis result when the diagnosis result is complete, and the processing unit further packages the specific failure category and the retrieved parameters as transaction data, and stores the transaction data in the transaction database.

8. The system of claim 1, wherein the processing unit further provides an operational interface, wherein the operational interface is provided to determine the specific failure category and to select one of the at least one suggested combination of parameters for a user, and the processing unit further transmits a command to the machine tool having the current abnormality via the network according to the selected suggested combination of parameters, wherein the command requests to retrieve the parameter values corresponding to the associated parameters corresponding to the selected suggested combination of parameters from the machine tool, and the operational interface is further provided to the user to input a diagnosis result, and when the diagnosis result represents that a diagnosis is complete, the processing unit further packages the specific failure category and the retrieved parameters as transaction data, and stores the transaction data in the transaction database.

9. The system of claim 1, wherein when a diagnosis result comprises that another suggested combination of parameters is suggested for selection, the processing unit further transmits another command corresponding to the associated parameters to the machine tool having the current abnormality via the network according to the another suggested combination of parameters, and the machine tool having the current abnormality retrieves parameter values corresponding to the respective associated parameters according to the received command, and transmits the parameter values to the remote monitoring host via the network.

10. A management method for machine tools to manage at least one machine tool via a network, comprising:
providing a storage unit recording a transaction database which comprises a plurality of transaction data, wherein each transaction data records a plurality of parameters corresponding to a failure category, and the failure category is one of a plurality of predefined failure categories when an abnormality occurs in the at least one machine tool, in which the failure category is corresponded to the abnormality, and the parameters are the parameters whose parameter values are retrieved from the at least one machine tool, having the abnormality, by a remote monitoring host according to the failure category; and
determining a specific failure category according to a current abnormality occurring in one of at least one machine tool, and generating at least one suggested combination of parameters according to the specific failure category and the transaction database, wherein the specific failure category is one of the predefined failure categories, and each suggested combination of parameters comprises a plurality of associated parameters, which are commonly retrieved for the specific failure category, the at least one suggested combination of parameters corresponding to the specific failure category is mined from the transaction data of the transaction database using a data mining technology developed by association rules, and the parameters corresponding to the failure category recorded in each transaction data are set as associated items in the association rule.

11. The method of claim 10, further comprising transmitting a command to the machine tool having the current abnormality via the network according to one of the at least one suggested combination of parameters, wherein the command requests to retrieve the parameter values corresponding to the associated parameters from the machine tool.

12. The method of claim 11, further comprising:
retrieving parameter values corresponding to the respective associated parameters by the machine tool having the current abnormality according to the command; and
transmitting the parameter values to the remote monitoring host by the machine tool having the current abnormality via the network.

13. The method of claim 11, further comprising providing an operational interface, wherein the operational interface is provided to record the plurality of parameters corresponding to the specific failure category for a user when the current abnormality is occurred in the machine tool having the current abnormality, and wherein the recorded plurality of parameters are stored to the transaction database.

14. The method of claim 10, further comprising:
generating an error code corresponding to the current abnormality when the current abnormality occurs, and transmitting the error code to the remote monitoring host via a network by the at least one machine tool; and
determining the specific failure category according to the error code.

15. The method of claim 14, wherein the storage unit further comprises a failure classification table for recording the predefined failure categories and at least one error code corresponding to the respective failure categories, and the method further comprises searching the failure classification table according to the error code transmitted from the machine tool to determine the specific failure category.

16. The method of claim 10, further comprising:
providing an operational interface, wherein the operational interface is provided to determine the specific failure category and to input a diagnosis result when the diagnosis result is complete for a user; and
packaging the specific failure category and the retrieved parameters as transaction data, and storing the transaction data in the transaction database.

17. The method of claim 10, further comprising:
providing an operational interface, wherein the operational interface is provided to determine the specific failure category and to select one of the at least one suggested combination of parameters for a user;
transmitting a command to the machine tool having the current abnormality via the network according to the selected suggested combination of parameters, wherein the command requests to retrieve the parameter values corresponding to the associated parameters corresponding to the selected suggested combination of parameters from the machine tool;
providing the operational interface to input a diagnosis result for the user when the diagnosis result is complete; and
packaging the specific failure category and the retrieved parameters as transaction data, and storing the transaction data in the transaction database.

18. The method of claim 10, further comprising:
when a diagnosis result comprises that another suggested combination of parameters is suggested for selection, transmitting another command corresponding to the associated parameters to the machine tool having the current abnormality via the network according to the another suggested combination of parameters; and retrieving parameter values corresponding to the respective associated parameters according to the received command, and transmitting the parameter values to the remote monitoring host via the network by the machine tool having the current abnormality.

19. A non-transitory machine-readable storage medium comprising a computer program, which, when executed, causes a device to perform a management method for machine tools, wherein the device comprises a storage unit recording a transaction database which comprises a plurality of transaction data, each transaction data records a plurality of parameters corresponding to a failure category, and the failure category is one of a plurality of predefined failure categories when an abnormality occurs in the at least one machine tool, in which the failure category is corresponded to the abnormality, and the parameters are the parameters whose parameter values are retrieved from the at least one machine tool, having the abnormality, by a remote monitoring host according to the failure category, and the method comprises:

determining a specific failure category according to a current abnormality occurring in one of at least one machine tool, and generating at least one suggested combination of parameters according to the specific failure category and the transaction database, wherein the specific failure category is one of the predefined failure categories, and each suggested combination of parameters comprises a plurality of associated parameters, which are commonly retrieved for the specific failure category, the at least one suggested combination of parameters corresponding to the specific failure category is mined from the transaction data of the transaction database using a data mining technology developed by association rules, and the parameters corresponding to the failure category recorded in each transaction data are set as associated items in the association rule.

* * * * *